United States Patent

Santelmann, Jr.

[11] Patent Number: 4,616,300
[45] Date of Patent: Oct. 7, 1986

[54] METHOD OF AND APPARATUS FOR EFFICIENT HIGH VOLTAGE GENERATION BY RESONANT FLY BACK

[75] Inventor: William F. Santelmann, Jr., Lexington, Mass.

[73] Assignee: Keltron Corporation, Waltham, Mass.

[21] Appl. No.: 450,532

[22] Filed: Dec. 17, 1982

[51] Int. Cl.[4] .............................................. H02M 3/335
[52] U.S. Cl. ........................................ 363/21; 363/61
[58] Field of Search .................... 363/18, 19, 20, 21, 363/59, 60, 61

[56] References Cited

U.S. PATENT DOCUMENTS

| 4,106,086 | 8/1978 | Holbrook et al. | 363/60 |
| 4,318,165 | 3/1982 | Kornrumpf et al. | 363/21 |
| 4,380,044 | 4/1983 | Parr | 363/21 |

FOREIGN PATENT DOCUMENTS 3125241  4/1982  Fed. Rep. of Germany ........ 363/25

OTHER PUBLICATIONS

"200 KHz Power FET Technology in OEM Modular Power Supply", *Electronic Engineer*, vol. 53, No. 656, Sep. 1981, pp. 39-42, 45-49.

*Primary Examiner*—Patrick R. Salce
*Assistant Examiner*—Anita M. Ault
*Attorney, Agent, or Firm*—Rines and Rines, Shapiro and Shapiro

[57] ABSTRACT

This disclosure is concerned with adapting very high-voltage, low-current, high impedance power source circuits, such as CRT anode supplies and the like, to employ the efficiency over wide input voltage ranges and other advantages, including small size, of switching-mode operation through combining variable frequency (or period) output control circuitry with resonant high-voltage transformers, wherein the transformer resonant frequency is rendered comparable to the desired range of conversion frequencies; and in which resonant flyback circuit operation drives a voltage multiplier such as to accommodate the resonance caused by the stray capacitance shunting its storage inductance.

17 Claims, 5 Drawing Figures

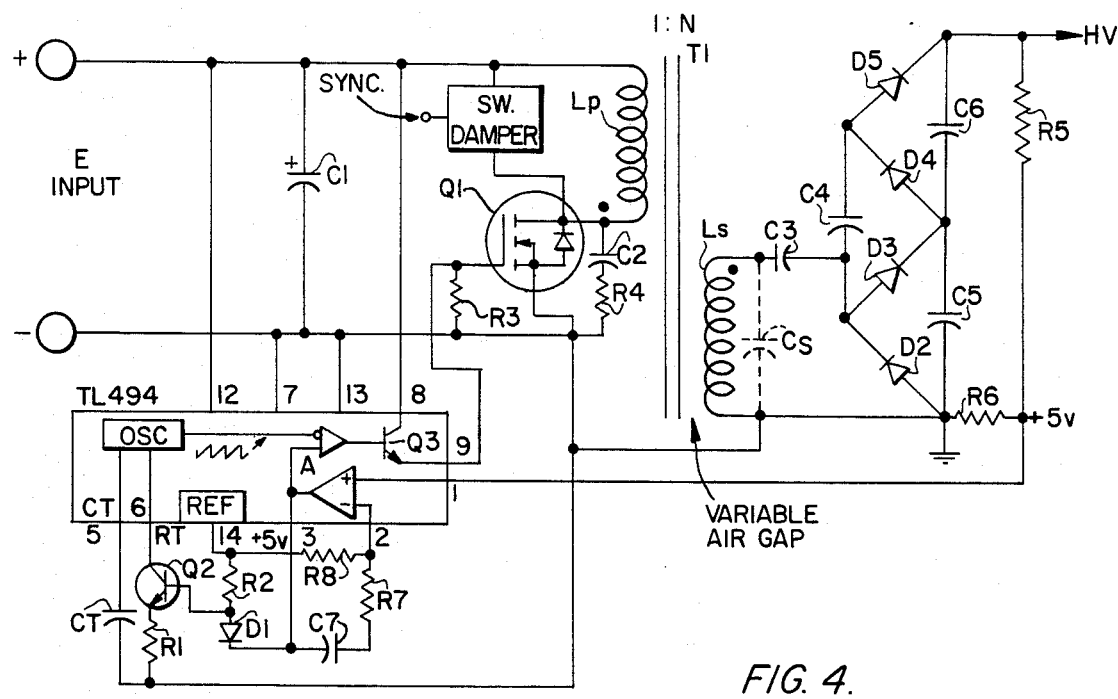
FIG. 3
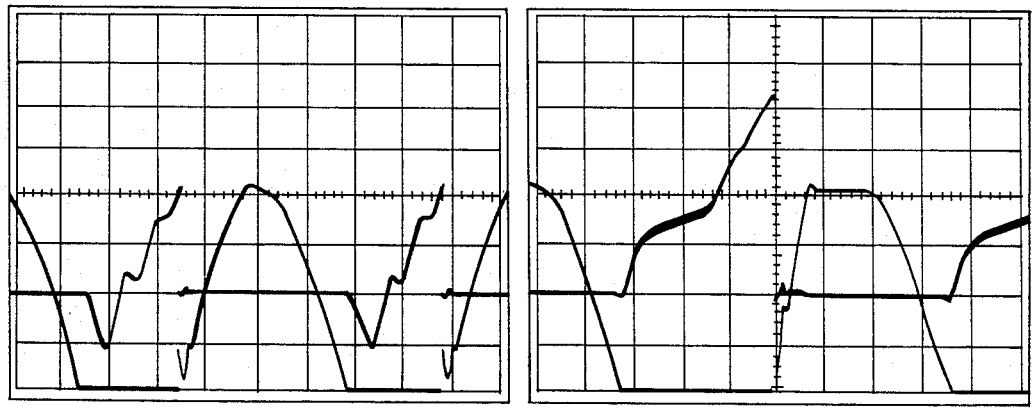
FIG. 4.
24 µA LOAD     1000 µA LOAD (89.4% EFFICIENCY)
DRAIN-SOURCE VOLTAGE AND DRAIN CURRENT WAVEFORMS AT 5µS/DIV.
TOP TRACE: CURRENT AT 0.2A/DIV.; BOTTOM TRACE VOLTAGE AT 100v/DIV.
FIG. 5.
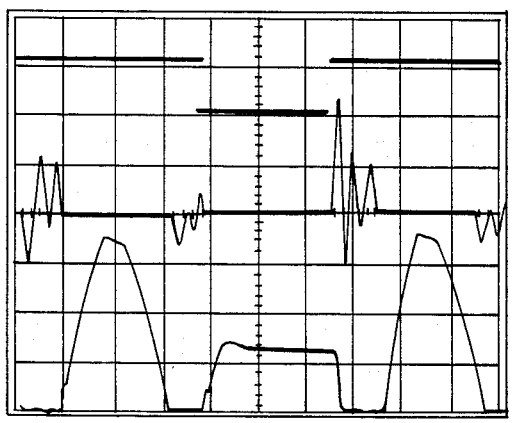
SWITCHED-DAMPER SYNCHRONIZATION WAVEFORMS AT 10uS/DIV.

METHOD OF AND APPARATUS FOR EFFICIENT HIGH VOLTAGE GENERATION BY RESONANT FLY BACK

The present invention relates to efficient high voltage generation for such applications as cathode-ray-tube (CRT) anode power supplies and the like and other high-voltage, low-current, high-impedance power supplies; being more particularly directed to new and improved methods of and apparatus for such purposes with adaptation for variable-period control and synchronization with external frequencies, if desired.

Though techniques embodying the use of high-frequency switching to achieve very high power efficiencies over wide input voltage ranges with small size and weight have been successfully applied to low-impedance low-voltage power supplies (as of the constant frequency buck and boost and flyback converter types) such have not heretofore been adapted for use, with similar efficiency advantages with high-impedance, very high-voltage, very low current power supplies because the stray capacitances shunting the storage inductances are no longer negligible, and in fact produce resonance frequencies comparable with the power conversion frequency. Conventional low-impedance, low-voltage power supply switching-mode concepts do not yield high efficiency in the type of high voltage power supply described above in view of the unavoidable stray capacitance present in the secondary circuit of a high-voltage transformer operating at ultrasonic conversion frequencies. Conventional techniques require fast voltage switching waveforms which are feasible because capacitances are relatively low; that is, the self-resonant frequencies of the inductive components are much higher than the conversion frequency. As output voltages increase, and currents decrease, the self-resonant frequencies drop into the range of desired conversion frequencies, and it is found that the load on the switching transistors becomes largely capacitive. Efficiency is then found to be degraded by the substantial power required to slew this capacitance through fast voltage waveforms.

Through a novel approach underlying the present invention, however, the advantages of similar switching mode operation can now be secured for high-impedance, very high-voltage, very low-current voltage generation despite such stray capacitance effects, and with added benefits of adaptability for variable period control and external frequency synchronization, where needed. This approach involves the use of a resonant flyback circuit design wherein the storage inductance of a flyback converter is resonated with its stray capacitance, permitting its voltage to change only as fast as its resonance will carry it, and consequently making possible power efficiencies between 85 and 90% in, for example, CRT anode power supplies and the like. The flyback interval at light loads is slightly longer than a half-period of the resonance, and increases somewhat with loading. The charging interval is nearly proportional to the load current at fixed output voltage, and inversely proportional to input voltage. The conversion period is the sum of these two intervals so that it, and the conversion frequency, become functions of input voltage and output load current. Fortunately, it is possible to adapt standard control chips, such as the TL494, manufactured by Texas Instruments Company, for variable-frequency operation at the cost of a single low-power transistor, so that practical utilization of this technique is feasible with such 85 to 90% efficiencies and significant size reductions. Additionally, reduced temperature rise is attained for enhanced reliability. A further advantage is the speed of regulation which is about an order of magnitude faster than customary circuits used for such CRT and related high voltage supplies.

An object of the invention, accordingly, is to provide a new and improved method of and apparatus for high-impedance, very high voltage, very low current voltage generation that is capable of using high speed switching-mode techniques despite the significant stray capacitance and susceptibility to production of resonance at frequencies comparable with the power conversion frequencies, and at high efficiencies.

A further object is to provide such a novel apparatus in which the expenditure of power for driving the capacitance of the high voltage transformer secondary circuit is advantageously minimized, wherein the secondary circuit is allowed to operate in resonance, and the inductance of the secondary is adjusted to control the resonant frequency to be compatible with the desired conversion frequency. The secondary inductance provides the reactive current and power to charge the secondary capacitance both positively and negatively with very little real power loss.

In accordance with the invention, this is accomplished in resonant flyback operation by injecting a controlled energy into the resonant circuit, as reflected into the primary of the high voltage transformer, during each conversion cycle, and then allowing the resonant circuit complete freedom to resonate or "ring" for a time between a half-cycle and a full-cycle. At the end of the conversion cycle, the initial energy, less the energy delivered to the load at the voltage peak and less the small circuit losses, is returned to the power source.

Energy is preferably injected by forcing the input voltage across the transformer primary with a transistor or other electronic switch for a controllable time. Most of the energy is stored in the form of current in the inductor at this point. Therefore, the "charging" time in each conversion cycle is variable over a wide range to accommodate changes in input voltage, output voltage, and load current. Since the resonant flyback interval is subject to less variation under the same changes, it is found that the conversion period and frequency must vary to accommodate input and output conditions. In fact, the circuit is necessarily driven with a variable frequency.

As before stated, moreover, it is possible to synchronize the conversion frequency to an external frequency. In accordance with the invention, this is preferably effected by insertion of a variable "dead time" into the conversion cycle by absorbing all of the remaining resonant energy into a resistor at the end of each resonant flyback pulse, so that the circuit may wait an arbitrary length of time before beginning the next conversion cycle. Among the applications for such operation is studio-quality television monitors, where output ripple voltage as little as 0.01% peak-to-peak will cause interference beat frequencies to appear in the display. In such situations, it is desirable to synchronize the conversion frequency of the power supply to the line scan frequency of the television raster. One method of synchronization with the resonant flyback technique of the invention is through the use of a conversion period somewhat shorter than the sync period. This conversion period may then be extended to equal the external sync period by the insertion of a variable "dead time" produced by a heavy damper resistance switched across the inductor after resonant flyback. Such a technique may introduce minimal cost in efficiency of about 10% at full load.

Other and further objects will be explained hereinafter and are more particularly delineated in the appended claims.

In summary, from one of its important aspects, the invention embraces a method of low-current, high voltage generation for high-impedance application to a load with the aid of a resonant circuit, that comprises, successively switching input energy from a source into the resonant circuit during each power conversion cycle within a desired range of conversion frequencies; adjusting the resonant circuit to enable resonant flyback operation with the storage inductance thereof resonating with its stray capacitance such as to permit free ringing of the same in response to said input energy for a time between a half and a full conversion cycle; delivering energy from said circuit to a load at the voltage peak developed within the circuit; and returning to the source at the end of each conversion cycle the remainder of the input energy after such energy delivery to the load, thus generating high efficiency operation over wide input voltage ranges. Preferred constructions and best mode embodiments are hereinafter set forth.

The invention will now be described with reference to the accompanying drawings, FIG. 1 of which is a graph plotting current and voltage waveforms in an ideal lossless resonant LC circuit;

FIG. 3 is a schematic circuit diagram of a preferred simplified resonant flyback high voltage power supply embodying the invention and the concepts of FIG. 2; and FIGS. 4 and 5 are oscillograms, respectively, of drain-source voltage and current waveforms of the operation of the apparatus of FIG. 3 and switched-damper synchronization waveforms for such operation.

Figure 1:
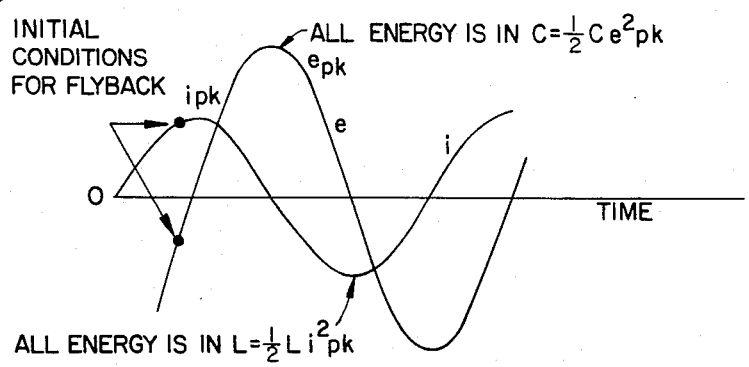
Figure 1:
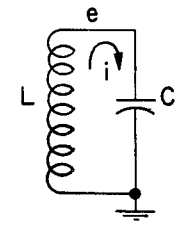

Referring to FIG. 1, a capacitor C and inductor L are shown in parallel forming a resonant circuit. If electrical energy is injected into this circuit, a sinusoidal oscillation of voltage and current will result which will persist (or "ring") after the energy source is disconnected. The total energy remains constant as it alternates between electrostatic energy in the capacitance C and electromagnetic energy in the inductor L, with sinusoidal current (i) and voltage (e) waveforms 90 degrees apart as illustrated along the horizontal time axis in FIG. 1. At the current peak (ipk), the voltage is zero so that all of the resonant energy is stored in the inductor as current. At the voltage peak (epk), 90 degrees or a quarter-cycle later, the current has become zero and all the resonant energy is stored in the capacitor C as voltage. This situation establishes the basic relationship between the peak values of voltage and current.

One method of injecting energy into the parallel resonant circuit of FIG. 1 is to connect a low-impedance DC voltage source E across the circuit for a time "t". The capacitor voltage quickly rises to the applied voltage and remains there, while the inductor current begins to rise from zero at a linear rate. When the voltage source is disconnected at the end of time "t", the total energy W stored in the resonant circuit is:

$$W = \frac{E^2}{2}\left(C + \frac{t^2}{L}\right).$$

At the instant the voltage source is disconnected, this energy begins to flow between the capacitor C and inductor L in a sinusoidal manner with a period $T = 2\pi\sqrt{LC}$. Assuming lossless components, all the stored energy will appear as a voltage peak epk on the capacitor according to the following equation:

$$epk = \sqrt{E^2\left(1 + \frac{t^2}{LC}\right)}.$$

This last equation establishes that the voltage peak epk is a function of the time "t", and offers a means of control of this voltage by time-modulation techniques.

If a rectifier is connected to this resonant circuit L-C to deliver current to a filter capacitor and load, another property of the circuit is quickly discovered. That property is that the only source of current for the rectifier is the current flowing in the inductor; and at the voltage peak, that current has become zero. Hence, no load current whatever is available at the voltage peak. As the load voltage becomes less than the expected peak, it is found that the inductor current i may be diverted through the rectifier to a load. In fact, if the load voltage becomes very small in relation to epk, one finds that the effect of the capacitance C becomes negligible and the circuit then resembles a low-voltage flyback converter.

A specific example of a resonant flyback converter using the above phenomena is presented in FIG. 2, and will be described with specific illustrations of voltage, current and time values to aid in the understanding of the underlying operation. Here, a 132-volt DC input voltage E is switched across the resonant circuit comprised of a 2.00 mH inductor L and 9.39 nF capacitor C by a switch S to ground which is closed for a time t1. The circuit is shown provided with a load R and a rectifier D connected across the resonant L-C circuit. When the switch opens, the voltage "e" rises in resonance toward a peak of 919 volts from ground, or 787 volts given by the above equation above its reference of the +132-volt input. The inductor current "i" actually continues to increase slightly while voltage "e" is less than the 132-volt level, true to its resonant equations. Above the 132-volt point, the inductor current begins to decline as expected. When the voltage "e" reaches 318 volts above the 132-volt input and the rectifier D begins to conduct, the inductor current has dropped to 1.5 amperes from an initial 1.68 amperes.

Figure 2:
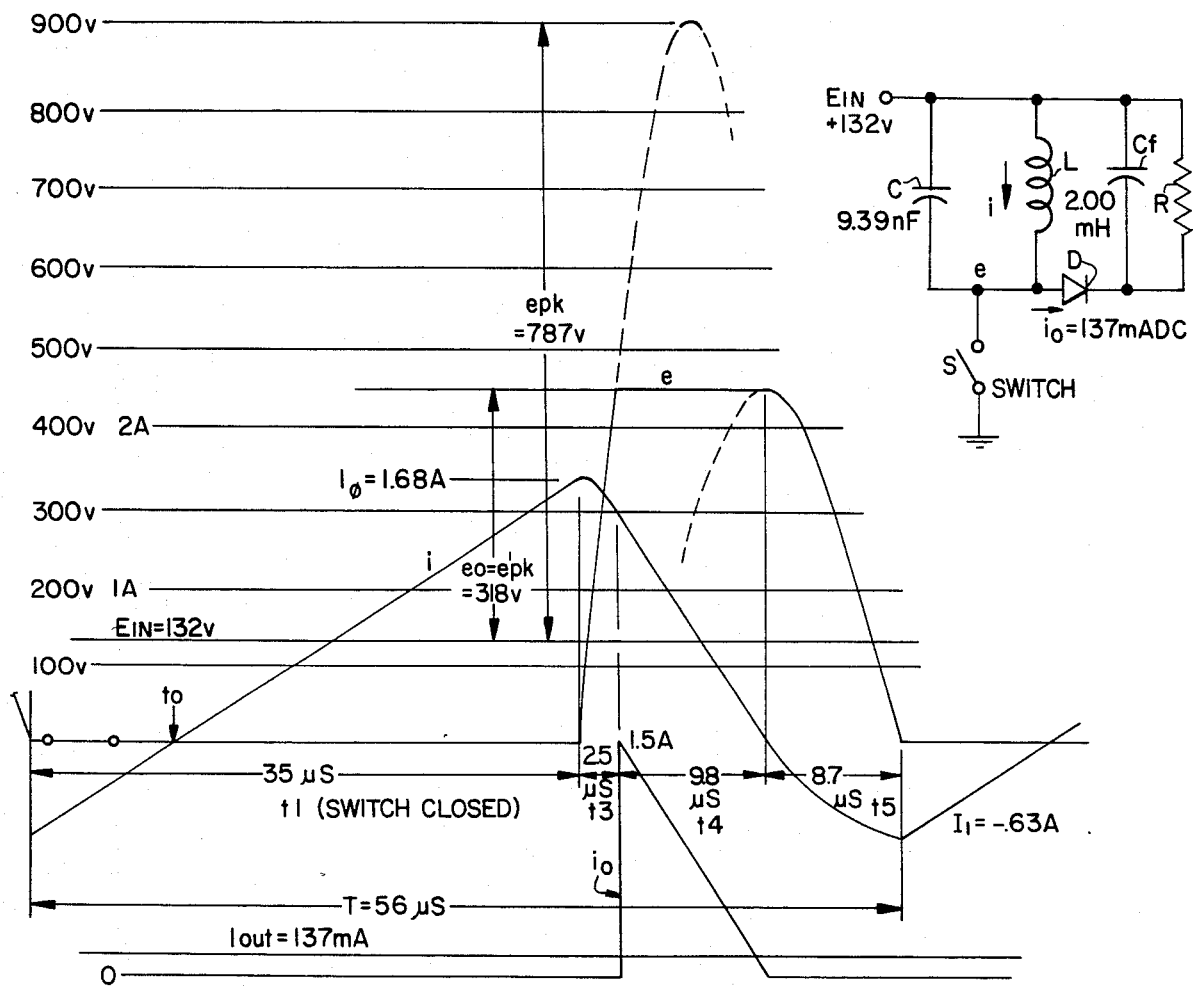
FIG. 2 is a similar diagram for switched conversion in accordance with the invention.

A filter capacitor Cf is connected across the load R and is made large enough so that its voltage rises imperceptibly in the waveform of FIG. 2 during conduction of the rectifier D. Hence, the rectifier D is able to divert the inductor current from its previous path through the resonant capacitor C to the filter capacitor Cf and its load R. Voltage "e" is the held constant at 318 volts above the 132-volt input while inductor current flows through the rectifier D. During this interval, shown as t4 in FIG. 2, the voltage across C is constant so that its current is zero. Since the voltage across inductor L is also constant, its current is decreasing linearly with time rather than sinusoidally. During interval t4, then, the rectifier current is the same as the inductor current and has a linear sawtooth waveshape. In the example shown, the DC load current is the average of this sawtooth shape over a 56 μS conversion period, or 137 mA.

At the end of time interval t4, the inductor current reaches zero while moving negatively. There is no longer any current available for forward conduction in the rectifier D, and it becomes non-conductive. Since the inductor current is zero, its stored energy is also zero, and the only resonant energy that remains is the 318-volt charge on the capacitor CF. A new "initial condition" has now been established on the resonant circuit in which the $e^1$pk is now 318 volts above the 132-volt reference. The voltage "e" then falls in free resonance and reaches the 132-volt line in a quarter-period of resonance, then continues toward zero voltage while the inductor current becomes negative in sinusoidal fashion.

Time interval t5 ends as "e" reaches zero and the switch S is closed once again to begin the following conversion cycle. The inductor current has now reached −0.63 amperes, and closure of the switch passes this current back to the 132-volt source. A fixed voltage of 132 volts now exists across the inductor L, so its current begins a positive linear change from the initial −0.63 ampere point. Energy is returned to the 132-volt source until the inductor current reaches zero at point t0, after which energy is once again withdrawn from this source. In 35 μS, the current has changed from −0.63 to +1.68 A and the switch S opens to repeat the above cycle of energy conversion, with the switch successively and repetitively applying the input voltage during each conversion cycle.

It is also helpful to view this process from an energy basis. For instance, the inductor energy at $I_0$ of 1.68 A (2.822 mJ) less the inductor energy at $I_1$ of 0.63 A (0.397 mJ) is the energy delivered to the load R, or 2.43 mJ, since the energy in C is the same at both points. This energy equals 318 volts DC output at 137 mADC for 56 μS. Or one can consider the difference in capacitor energy between epk of 787 volts and $e^1$pk of 318 volts as the energy delivered to the load R per cycle. On a power basis, this example represents conversion of 43.4 watts.

FIG. 3 represents a simplified schematic of a resonant flyback high voltage power supply embodying the technique of the invention including the type of operation described in connection with FIG. 2. A four-rectifier voltage multiplier is shown at $D_2$–$D_5$ which will deliver a HVDC output approaching twice the peak-to-peak voltage delivered by the secondary winding $L_s$ of power transformer T1. In fact, it has been found that any number of "full-wave" multiplier stages (an even number of rectifiers) may be used, to at least seven, for a 50 KV output. The secondary inductance $L_S$ is designed to deliver a peak-to-peak voltage equal to the maximum high voltage DC output divided by the number of full-wave multiplier stages (or by twice the number of rectifiers) at the lowest desired operating frequency.

While the example in FIG. 2 illustrates a half-wave rectifier D in which energy flows to the load R through the rectifier D only during the positive flyback peaks, the full-wave rectifiers $D_2$–$D_5$ of FIG. 3 pass energy to the load on both the positive and negative peaks. The energy transferred on the positive peak is from resonant flyback action, while that transferred on the negative peak is by ordinary transformer action with switch Q1 conducting and placing the full input voltage on the transformer primary $L_P$.

Capacitor $C_S$ represents the unavoidable stray capacitance of capacitors C3 and C4 to ground, plus the internal winding capacitance of the transformer secondary $L_S$ itself. It is reflected into the transformer primary $L_P$ as a capacitance $N^2$ times as large as $C_S$, where N is the turns ratio of transformer $T_1$ (represented as capacitance "C" in FIG. 2).

In accordance with the invention, transformer $T_1$ may normally use a ferrite core which contains an air gap adjusted to obtain a secondary inductance $L_S$ which will resonate $C_S$ at the desired frequency. The value of $L_S$ is then reflected into the primary as $1/N^2$ times $L_S$ (which is equivalent to "L" of FIG. 2). The transformer primary $L_P$ is designed so that its peak-to-peak voltage at minimum HV output is somewhat more than twice the maximum input voltage, say 2.2 times. The transformer turns ratio "N" is then the ratio of the peak-to-peak voltage of the secondary to that of the primary. Primary-to-secondary coupling must be "tight" to minimize leakage inductance while maintaining high-voltage integrity in the secondary $L_S$. Energy stored in the leakage inductance cannot be delivered to the output but must be dissipated by damper resistor R4 connected with capacitor $C_2$ between the lower terminal of $L_P$ and the negative terminal of the input voltage.

The switch $Q_1$ is illustrated in the form of field-effect transistor (FET), serving as the power switch. The integral reverse diode in the FET is also of value in conducting the reverse current $I_1$ (FIG. 2) after the resonant flyback fall during t5. The FET power switch $Q_1$ may be driven directly by a conventional PWM integrated circuit such as the TL494 shown in FIG. 3, embodying a saw-tooth oscillator OSC, operational amplifier A and output transistor $Q_3$ for driving the FET switch $Q_1$. The TL494 generates a positive-slope sawtooth (waveform shown at right of OSC) which is compared with the amplified error signal from the internal operational amplifier A. The output stage transistor $Q_3$ is turned on, and drives $Q_1$ on, when this sawtooth is more positive than the amplified error voltage terminal 3 of the TL494. Therefore, the desired negative feedback for voltage regulation is achieved by feeding the 5-volt sample of the high voltage output into the + terminal of the operational amplifier A; and the 5-volt reference, into the − terminal of A through $R_8$. The damping of the regulating loop is controlled by $C_7$ and $R_7$.

Referring back to FIGS. 1 and 2, it will be noted that interval t1 is variable over a wide range as a function of input voltage, output voltage, and output load. Also interval t4 increases under load. These effects will not permit operation at a fixed conversion period or frequency. In practice, the period should be longer at lower input voltages and higher output voltages and load current, and shorter as these parameters reverse. Fortunately, it is quite simple to adapt the TL494 to variable-period operation with the addition of components $D_1$, $R_2$, and $Q_2$ to the usual timing resistor $R_1$. These components transfer the amplified error voltage from the output of the operational amplifier A at terminal 3 to the top of $R_1$ so that the current through $R_1$, and the timing current to terminal 6, is proportional to this error voltage. Thus, as the error signal becomes more positive, the conduction time t1 is reduced, while the timing current increases and the sawtooth period decreases, as desired.

This circuit is reasonably tolerant of timing errors. For instance, the reverse current $I_1$ in FIG. 2 will flow through the integral reverse diode of $Q_1$ and prevent the drain voltage "e" from passing negatively through ground. The gate of $Q_1$ may be turned on at any time between the end of interval $t_5$ and $t_0$ without changing the operating condition of the circuit. In reality, the output control of this resonant flyback circuit is primarily through modulation of the conversion frequency by $Q_2$.

The waveforms of FIG. 4 illustrate the performance of a resonant-flyback converter operating from a 160-volt DC input and delivering 24 KV from a four-stage (full-wave) voltage multiplier of the type shown in FIG. 3. The "ringing" present in the current waveforms is at the frequency of resonance between the transformer leakage inductance and the secondary stray capacitance as reflected into the primary $L_P$. At 1,000 $\mu$A load, the current waveform is also seen to rise positively immediately after the drain voltage falls to zero, rather than flowing negatively as at 24 $\mu$A load. This positive rise represents current required for charging the voltage multiplier on its negative voltage peak using simple transformer conversion. A small positive spike will also be observed on the drain voltage waveform at the instant the drain current is cut off. This is the usual leakage inductance spike which is controlled with the damper $C_2$ and $R_4$ of FIG. 3.

The usual starting point in a resonant flyback design of the invention is to define the parameters of input voltage range, output voltage range, output load range, maximum conversion period (minimum frequency), and secondary stray capacitance load, Cs. Using the transformer turns ratio N, Cs is reflected to the primary as a capacitance $N^2$ larger. Then, the primary inductance L may be calculated from the energy and timing relationships. This calculation should be made for the lowest input voltage, and maximum conversion period, output voltage, and load. For these types of circuits and this type of operation of the invention analysis has shown that $$L = \left[ \frac{E_{min}T_m}{Z} (E_{min}K \sqrt{C_P} - \sqrt{E^2_{min}K^2 C_P - Z} ) \right]^2 \text{ henries,}$$

where $E_{min}$ is the minimum input voltage; $T_m$ the selected maximum conversion period (in seconds); $C_P$ is the secondary stray capacitance $C_S$ in farads as reflected into the primary winding $L_P$; K is a constant involving $e_{pk}$, $e_o$, $E_{min}$ and the output voltage $e_o$; and Z is given by the expression $$Z = C_P[E^2_{min}(K^2+1) - e_o^2] - 2P_f T_M,$$

where $C_P$ is the secondary stray capacitance $C_S$ in farads as reflected into the primary $L_S$, and $P_f$ is the output power delivered only by resonant flyback. Knowing L, one may determine the timing requirements for the driver under all input and output conditions, and the peak current rating for the switch transistor $Q_1$.

Sensing of the output load current by means of a resistor inserted in the ground return of the high voltage multiplier affords a signal which may be used in TL494 for the purpose of current-limiting and overload protection. As the output voltage falls under this type of current limiting, the point is soon reached where the switch current through $Q_1$ reaches dangerous peaks. A "current sense latch", such as of the type SG1549, for example, is very effective protection when used to monitor the source or drain current in $Q_1$ and drive terminal 4 of TL494 off when excessive currents are experienced. Under a "dead-short", the drain current of $Q_1$ increases rapidly when it is turned on, limited only by the leakage inductance of $T_1$. The SG1549 is able to respond quickly, and the FET used for $Q_1$ also shuts down very quickly because of its lack of storage time, so that continuous operation into a short circuit with very small input power consumption is possible.

As before stated, external synchronization features are sometimes desirable. There appear to be two feasible methods of synchronization of the conversion frequency to an external clock, such as the horizontal scanning raster frequency of a television system. One utilizes a heavy damper, which is switched across the primary after the resonant flyback interval, to absorb any remaining resonant energy and permit the resonant circuit to wait an arbitrary length of time before repeating a conversion cycle.

Such a system, synchronized to a TV line-scan frequency of 15.75 KHz, for example, operates with the waveforms of FIG. 5. It is operating from a 134-volt input and generating a 24 KV output of 24 $\mu$A. The bottom trace is the drain-source waveform of $Q_1$ at 100 volts per division and shows two flyback pulses with a "dead time" between them produced by a switched damper. The top trace is the damper control waveform, in which the negative portion switches the damper on. The center trace is the drain current in $Q_1$ at 1 ampere per division. Its ringing is at the frequency of resonance between the transformer leakage inductance and the secondary stray capacitance Cs as reflected into the primary.

The cost of synchronization in terms of power efficiency has been observed to be about 10% making possible over-all power efficiencies between 75 and 80% at full load. It is important to note that the efficiency, and input power, of a resonant flyback circuit operating with a fixed load is almost invariant with input voltage over a wide range.

Another method which shows promise for synchronization uses a phase comparator to compare the conversion frequency with an external frequency. The output signal of the phase comparator is then used to control the conversion frequency by modulation of either or both of the resonant components, L or C, to form a phase-locked-loop system.

The switching mode-resonant flyback technique of the invention thus provides a method of obtaining the considerable advantages of very high power efficiency over a wide input voltage range in the design of high voltage power supplied.

As above illustrated, this resonant flyback scheme may carefully be employed to convert power from low voltages, say 20 to 180 VDC, to very high voltage, say 10 KV to 50 KV, at power levels from about 10 to 200 watts and with high impedance in the range of 1–250 Megohms. Power conversion efficiencies of 85 to 90% have been achieved which are almost constant over an unusually wide input voltage range. The advantages of small size and very low heat dissipation which have made switching-mode techniques so successful in low voltage power supplies are thus now accessible to designers of high voltage supplies.

The invention thus provides for the combination of variable frequency (or period) output control circuits with a resonant high-voltage transformer to enable efficient generation of high voltage power when the transformer resonant frequency is comparable with the desired range of conversion frequencies. The output power is in the form of an asymmetric alternating voltage which may be used directly or may be applied to conventional voltage-multiplying rectifiers for generation of high D.C. voltages. Control may be open or closed loop for regulated performance. Through the use of a switched damper, residual resonant energy may be absorbed after each conversion cycle and synchronization may be attained with external frequencies. The variable-period control-resonant transformer system is particularly adapted to achieve frequency synchronization with the reactance switch control by phase locked loop.

Further modifications will occur to those skilled in this art, and such are considered to fall within the spirit and scope of the invention as defined in the appended claims.

What is claimed is:

1. A method of low-current, high voltage generation for high-impedance application to a load with the aid of a resonant circuit, that comprises, successively switching input energy from a source into the resonant circuit during an energy input interval that is a portion of each of a plurality of power conversion cycles; adjusting the resonant circuit to enable resonant flyback operation, with storage inductance thereof resonating with capacitance thereof, and to permit free ringing of the circuit during another portion of each conversion cycle; delivering energy from said circuit to a load at the voltage peak developed within the circuit; returning to the source at the end of each conversion cycle the remainder of the energy therein after each energy delivery to the load; and varying the energy input interval in each of the conversion cycles in response to variations in the load so that the length of the energy input intervals is directly proportional to the load.

2. A method as claimed in claim 1 and in which said resonant circuit comprises a secondary winding of a transformer having stray capacitance and to the primary winding of which said input energy is switched during each conversion cycle; said secondary winding inductance being selected to control the resonance frequency to be compatible with the desired conversion frequency, providing the reactive current and power to charge the secondary capacitance both positively and negatively with minimal real power loss.

3. A method as claimed in claim 2 and in which said switching of the input energy is effected by forcing the input voltage across the transformer primary winding under the control of an electronic switch for a controllable time, with most of the energy being stored in the form of current in inductance at such point.

4. A method as claimed in claim 3 and in which variable frequency drive is provided for said circuit to enable variation in energy storing time.

5. A method as claimed in claim 3 and in which the frequency of power conversion is synchronized with an external frequency.

6. A method as claimed in claim 5 and in which the synchronization is effected by absorbing all of the remaining resonant energy at the end of each resonant flyback pulse to insert a delay before the beginning of the next conversion cycle.

7. A method as claimed in claim 6 and in which the dead time introduced by said delay into the conversion cycle is varied to enable synchronization with external frequencies.

8. A method as claimed in claim 1 and in which the energy input intervals are varied so as to maintain the length of the intervals inversely proportional to the input voltage of said source and directly proportional to the load voltage and load current.

9. A low-current, high-voltage power supply apparatus for a high impedance load having, in combination, a resonant circuit connected with a control circuit comprising switching means for successively forcing an input voltage into the resonant circuit for a variable energy input interval that is a portion of each of a plurality of power conversion cycles; said resonant circuit being constructed to operate in resonance flyback at a frequency comparable to a desired power conversion frequency and to provide free-ringing of capacitance of the resonant circuit shunting storage inductance thereof during another portion of each power conversion cycle; and feedback means for operating the control circuit to vary each energy input interval so that the length of the energy input intervals is directly proportional to the load.

10. Apparatus as claimed in claim 9 and in which the said flyback circuit is connected to drive voltage multiplier means.

11. Apparatus as claimed in claim 9 and in which said resonant circuit comprises transformer means the high voltage secondary winding of which has its inductance selected to resonate with its stray capacitance to render the resonant frequency compatible with the desired conversion frequency.

12. Apparatus as claimed in claim 11 and in which the primary winding of said transformer means is connected with said switching means to inject the said input voltage for each conversion cycle.

13. Apparatus as claimed in claim 9 and in which the flyback interval at light loads is slightly longer than a half-period of the resonance, increasing somewhat with loading, with the output power being in the form of successive asymmetric alternating voltages useful for direct power supply or for voltage-multiplier rectification for very high D.C. voltages.

14. Apparatus as claimed in claim 9 and in which means is provided for connecting means to absorb residual resonant energy after each conversion cycle for enabling synchronization with external frequencies.

15. Apparatus as claimed in claim 14 and in which said connecting means comprises switching means for connecting resistance to the resonant circuit and controlled to achieve frequency synchronization.

16. Apparatus as claimed in claim 14 and in which said switching means comprises a solid-state power switch such as a field-effect transistor and the secondary winding drives a full-wave voltage rectifier multiplier circuit.

17. Apparatus as claimed in claim 9 and in which said control circuit comprises means for varying the energy input intervals so that the length thereof is inversely proportional to the input voltage and directly proportional to the load voltage and load current.

* * * * *